United States Patent
Yu et al.

(10) Patent No.: US 10,019,402 B2
(45) Date of Patent: Jul. 10, 2018

(54) FLEXIBLE NVME DRIVE MANAGEMENT SOLUTION VIA MULTIPLE PROCESSOR AND REGISTERS WITHOUT MULTIPLE INPUT/OUTPUT EXPANDER CHIPS

(71) Applicant: Quanta Computer Inc., Taoyuan (TW)

(72) Inventors: Chun-Chin Yu, Taoyuan (TW);
Shuen-Hung Wang, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 169 days.

(21) Appl. No.: 15/153,014

(22) Filed: May 12, 2016

(65) Prior Publication Data

US 2017/0329736 A1 Nov. 16, 2017

(51) Int. Cl.
| | |
|---|---|
| G06F 13/00 | (2006.01) |
| G06F 13/40 | (2006.01) |
| G06F 3/06 | (2006.01) |
| G06F 13/16 | (2006.01) |
| G06F 13/42 | (2006.01) |

(52) U.S. Cl.
CPC ........ *G06F 13/4068* (2013.01); *G06F 3/0604* (2013.01); *G06F 3/0653* (2013.01); *G06F 3/0683* (2013.01); *G06F 13/1668* (2013.01); *G06F 13/4282* (2013.01)

(58) Field of Classification Search
CPC .............................................. G05F 13/4068
See application file for complete search history.

(56) References Cited

U.S. PATENT DOCUMENTS

| | | | |
|---|---|---|---|
| 8,078,770 B1 | 12/2011 | Sivertsen | |
| 8,769,213 B2 | 7/2014 | Skinner et al. | |
| 9,645,902 B2 * | 5/2017 | Breakstone | ......... G06F 11/2012 |
| 9,933,976 B2 * | 4/2018 | Tsujimoto | ............ G06F 3/0659 |
| 2007/0079032 A1 | 4/2007 | Bissessur et al. | |
| 2016/0306549 A1 * | 10/2016 | Nadakuditi | ............. G06F 3/061 |

FOREIGN PATENT DOCUMENTS

| | | |
|---|---|---|
| TW | I537976 B | 6/2016 |
| WO | 2015200313 A1 | 12/2015 |

OTHER PUBLICATIONS

Extended European Search Report for EP Application No. 17170680.7, dated Oct. 12, 2017.
Taiwanese Office Action for Application No. 105121208, dated Jan. 17, 2017, w/ English First Office Action Summary.

* cited by examiner

*Primary Examiner* — Tammara R Peyton
(74) *Attorney, Agent, or Firm* — Nixon Peabody LLP; Eduardo J. Quiñones; Zhou Lu

(57) ABSTRACT

In some embodiments, a system for flexible non-volatile memory express drive management can include a first controller including a first drive register and a second drive register, a first processor communicatively coupled with the first drive register via a first serial bus, and a second processor communicatively coupled with the second drive register via a second serial bus. The system can also include a first set of non-volatile memory express drives communicatively coupled with the first processor via the first drive register, and a second set of non-volatile memory express drives communicatively coupled with the second processor via the second drive register and the second serial bus.

20 Claims, 11 Drawing Sheets ced via the peripheral component interconnect express (PCIe) standard. NVMe technologies leverage the speed of non-volatile memory devices, such as SSDs, with the high-bandwidth bus communications supported by PCIe, to provide significant improvements in storage performance, capacity, and reliability. Not surprisingly, NVMe technologies have been

FLEXIBLE NVME DRIVE MANAGEMENT SOLUTION VIA MULTIPLE PROCESSOR AND REGISTERS WITHOUT MULTIPLE INPUT/OUTPUT EXPANDER CHIPS

TECHNICAL FIELD

The subject matter herein generally relates to light emitting diodes (LED) as hard disk drive (HDD) status indicators and non-violate memory express (NVMe) drives. More specifically, the subject matter herein relates to a controller to time manage a plurality of LEDs without the need for additional LED control lines and management of topologies for drives.

BACKGROUND

Non-volatile memory express (NVMe) is a logical device interface specification for non-volatile storage media, such as solid-state drives (SSDs), attached via the peripheral component interconnect express (PCIe) standard. NVMe technologies leverage the speed of non-volatile memory devices, such as SSDs, with the high-bandwidth bus communications supported by PCIe, to provide significant improvements in storage performance, capacity, and reliability. Not surprisingly, NVMe technologies have been implemented with increasing regularity in server and datacenter environments, to meet the higher performance demands in these deployments.

Large deployments may include numerous NVMe drives for added capabilities. Each NVMe drive is typically assigned to a specific processor which manages and monitors that NVMe drive. A processor can be assigned to multiple NVMe drives, to manage and monitor those NVMe drives. To connect a processor with multiple NVMe drives, input/output expander chips are generally implemented, with each expander chip connecting an NVMe drive to a particular processor. Each NVMe drive assigned to a processor requires a respective input/output expander chip to connect to that processor, and each NVMe drive added requires an additional input/output expander chip. Accordingly, large deployments with numerous NVMe drives require a large number of input/output expander chips to connect the NVMe drives with respective processors. As a result, the current solutions are costly, inflexible, and cumbersome.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The approaches set forth herein can be used to efficiently manage non-volatile memory express (NVMe) drives. For example, the approaches set forth herein can provide an NVMe topology which allows multiple NVMe drives to connect to a respective processor through a register, without multiple input/output expander chips. Multiple processors can be connected to multiple registers, where each register can handle a group of NVMe drives. A controller can be connected to the drive registers to communicate with the groups of NVMe drives and the multiple processors. The controller can then manage and monitor the various groups of NVMe drives. The controller can also detect communication failures and enable a failover path for connecting a group of NVMe drives to a different processor when a current path between that group of NVMe drives and the processor fails.

Disclosed are technologies for flexible NVMe drive management. In some examples, a system can include a first controller including a first drive register and a second drive register, a first processor communicatively coupled with the first drive register via a first bus, and a second processor communicatively coupled with the second drive register via a second bus. Moreover, the system can include a first set of NVMe drives communicatively coupled with the first processor via the first drive register, and a second set of NVMe drives communicatively coupled with the second processor via the second drive register and the second serial bus.

The system can also include a second controller, such as a baseboard management controller (BMC), which can be communicatively coupled with the first drive register and the second drive register. The second controller can be coupled with the first drive register and the second drive register via one or more serial buses. The second controller can be configured to determine, record, and/or maintain status information about the first set of NVMe drives and the second set of NVMe drives. The second controller can communicate with the first drive register and the second drive register to determine the status of the first and second set of NVMe drives. For example, the second controller can send/receive status signals to and from the first and second drive registers. The second controller can also send control signals to the first and second drive registers, for controlling the first and second drive registers and/or the first and second set of NVMe drives.

The first processor can be configured to communicate with the first drive register to obtain status information about the first set of NVMe drives and/or control and manage the first set of NVMe drives. Moreover, the second processor can be configured to communicate with the second drive register to obtain status information about the second set of NVMe drives and/or control and manage the second set of NVMe drives.

The first processor can also be communicatively coupled via a serial bus with the second drive register for failover. Similarly, the second processor can be communicatively coupled via a serial bus with the first drive register for failover. The second controller can monitor the link between the first processor and the first drive register as well as the link between the second processor and the second drive register to provide a failover path in the event of a failure. For example, the second controller can detect a failure of the communication path between the first processor and the first register, and trigger the second processor to communicate with the first drive register and take over the first processor's role in managing and monitoring the first set of NVMe drives.

The system can also include latch logic circuitry communicatively coupled with the second controller and one or more NVMe drives associated with the first set of NVMe drives or the second set of NVMe drives. For example, an NVMe drive can be coupled with the latch logic circuitry via a respective pin on the latch logic circuitry. The pin can be configured to output a respective power enable bit to the NVMe drive to power the NVMe drive. The power enable bit can be triggered in response to a presence bit transmitted by the NVMe drive to the second controller and/or the latch logic circuitry.

The latch logic circuitry can also include a respective input pin configured to receive a power enable bit(s) from the second controller, to be transmitted to the NVMe drive to power the NVMe drive. The second controller can include a respective presence pin communicatively coupled with the respective input pin of the latch logic circuitry. The respective presence pin can be configured to function as a multi-function pin capable of receiving presence bits from the NVMe drive and sending one or more power enable bits to the respective input pin of the latch logic circuitry, to be transmitted to the NVMe drive for powering the NVMe drive.

BRIEF DESCRIPTION OF THE DRAWINGS

The above-recited and other advantages and features of the disclosure will become apparent by reference to specific embodiments thereof which are illustrated in the appended drawings. Understanding that these drawings depict only example embodiments of the disclosure and are not therefore to be considered to be limiting of its scope, the principles herein are described and explained with additional specificity and detail through the use of the accompanying drawings in which.

DETAILED DESCRIPTION

Figure 1:
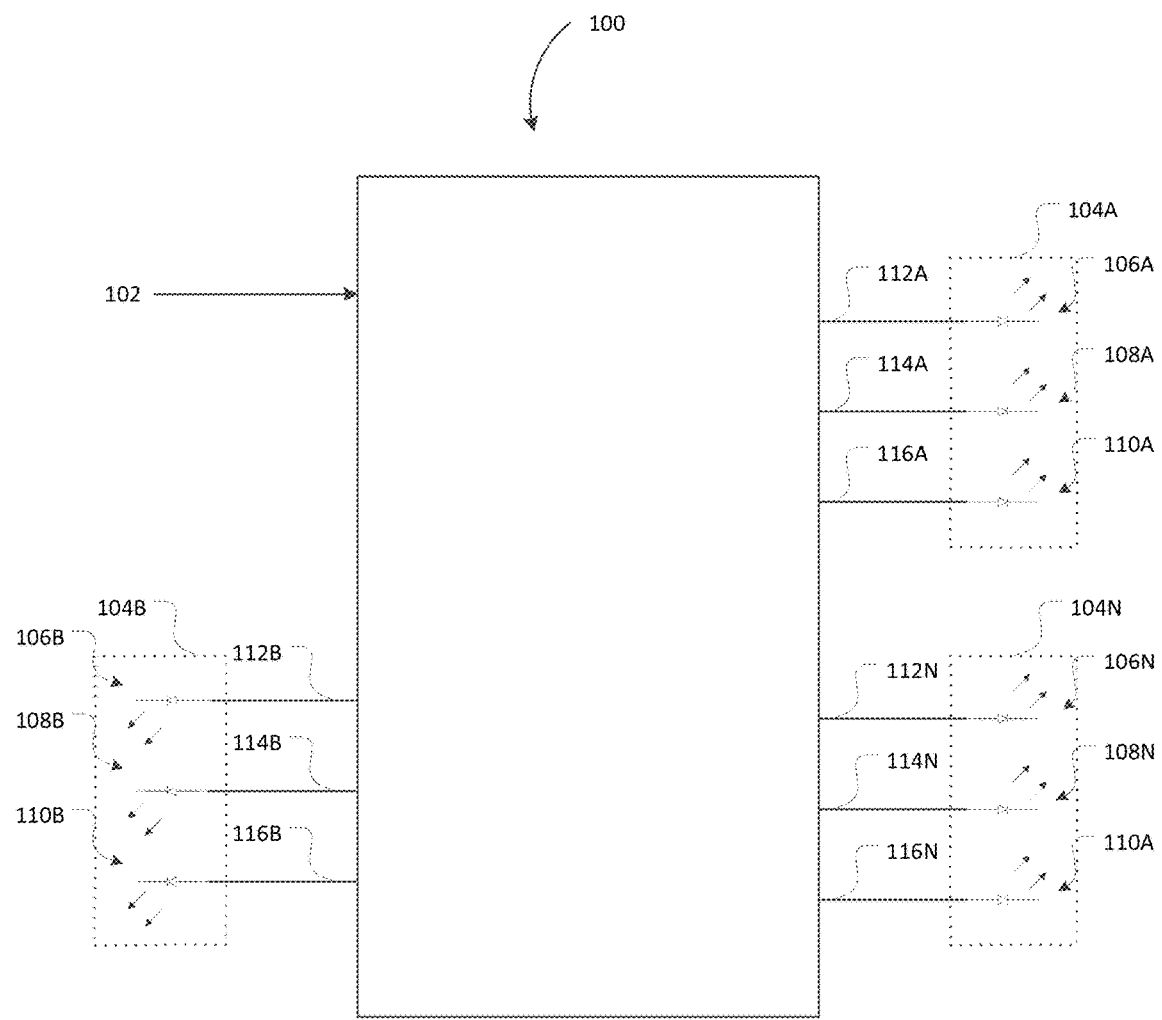
FIG. 1 shows an LED controller of the prior art.

Various examples of the disclosure are discussed in detail below. While specific implementations are discussed, it should be understood that this is done for illustration purposes only. A person skilled in the relevant art will recognize that other components and configurations can be used without parting from the scope of the disclosure. In other instances, well-known methods, procedures, components, circuits, and networks have not been described in detail so as not to necessarily obscure aspects of the embodiment.

It will also be understood that, although the terms first, second, etc. can be used herein to describe various elements, these elements should not be limited by these terms. These terms are only used to distinguish one element from another. For example, a first sensor could be termed a second sensor, and similarly, a second sensor could be termed a first sensor, without departing from the scope of the present description.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or"upon detecting [the stated condition or event]" or "in response to detecting [the stated condition or event]," depending on the context.

As used herein, the term "drive" may be construed to mean a hard disk drive (HDD), a solid state drive (SSD), or any other type of physical hardware device used to store electronic data.

The disclosed technology addresses the need in the art for an LED controller capable of controlling a larger number of LEDs of drives, such as a time sharing hard disk drive light emitting diode controller. Current controllers require individual control lines for each LED of each drive. New time sharing controllers require three control lines for the three LEDs (e.g., activity, locate, fail) of each drive, along with a plurality of selection lines configured to select a specific drive (and the three LEDs) per time cycle. A new time sharing controller can be configured to control a higher number of LEDs based on a reduced number of required control lines.

The disclosed technology also addresses the need in the art for managing drives (e.g., non-volatile memory express NVMe drives, etc.). A detailed description of management of drives, including examples and variations, are described herein. These variations shall be described herein as the various embodiments are set forth.

Figure 2:
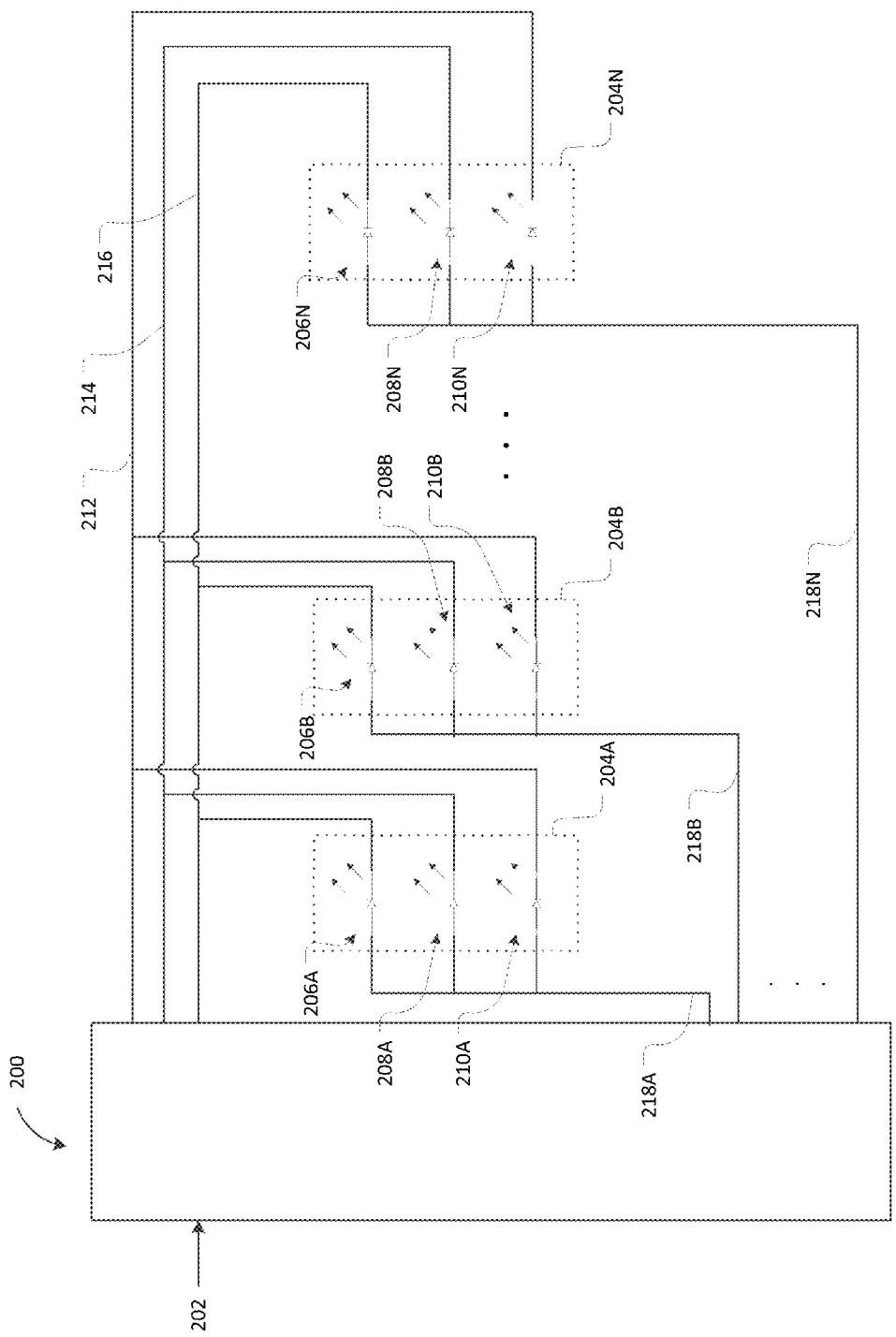
FIG. 2 shows an example LED controller for implementing various embodiments of the present technology.

FIG. 2 shows an example time sharing LED controller configured to control a high number of LEDs. Controller 200 can include an input 202. Input 202 can be coupled to a serial general purpose input/output (SGPIO) bus. Input 202 can be configured to receive via the SGPIO bus, a sequence of bits. The sequence of bits can include at least 3 bits of data related to an activity, locate and fail. For example, when an activity LED is to be illuminated, the bit related to activity is binary high (i.e., 1). Alternatively, when the activity LED is not to be illuminated, the bit related to activity is binary low (i.e., 0). The sequence of bits can also include one or more bits of data related to a selection of a drive. The bits related to the selection of a drive can be exponentially proportional to the number of drives connected to controller 200 (i.e., $2^n$=x, where x is equal to the number of drives connected to the controller). For example, when four drives are connected, at least two bits must be used for selection. When eight drives are connected, at least three bits must be used for selection.

Controller 200 can also be coupled to a plurality of drives 204A, 204B, . . . 204N (collectively "204"), which can each include an activity LED 206A, 206B, . . . , 206N (collectively "206"), a locate LED 208A, 208B, . . . , 208N (collectively "208"), and a fail LED 210A, 210B, . . . , 210N (collectively "210"). Controller 200 can be coupled to activity LED 206 of each drive 204 by activity control line 212 and one of a plurality of selection lines 218A, 218B, . . . , 218N (collectively "218"). Each selection line 218 corresponds to a specific drive 204. For example, selection line 218A corresponds to drive 204A (and LEDs 206A, 208A, 210A), selection line 218B corresponds to drive 204B (and LEDs 206B, 208B, 210B), etc.

In some examples, controller 200 can be configured to receive a sequence of six bits from a drive controller via the SGPIO bus. Three of the bits (e.g., most significant) can be reserved for setting the three LEDs 206, 208, 210 of the selected drive 204. The other three bits (e.g., least significant) can be used in the selection of one of the drives 204. For example, a sequence of bits can be 100001. The first three bits of the sequence (i.e., 100) correspond to the LEDs, here, activity LED 206 will be illuminated as the first bit is binary high (i.e., 1). The locate and fail LED will not be illuminated as the remaining bits are binary low (i.e., 0). The other three bits (i.e., 001) correspond to the selection of drive 204B (i.e., the second drive). Thus, activity LED 204B will be illuminated. The activity bit carrying binary high indicates activity in the drive. The activity bit carrying binary low indicates no activity in the drive. The locate bit carrying binary high indicates a user attempting to locate the drive. The fail bit carrying binary high indicates a failure at the drive. A drive failure can be further determined based on a pattern displayed at the fail LED.

Figure 3:
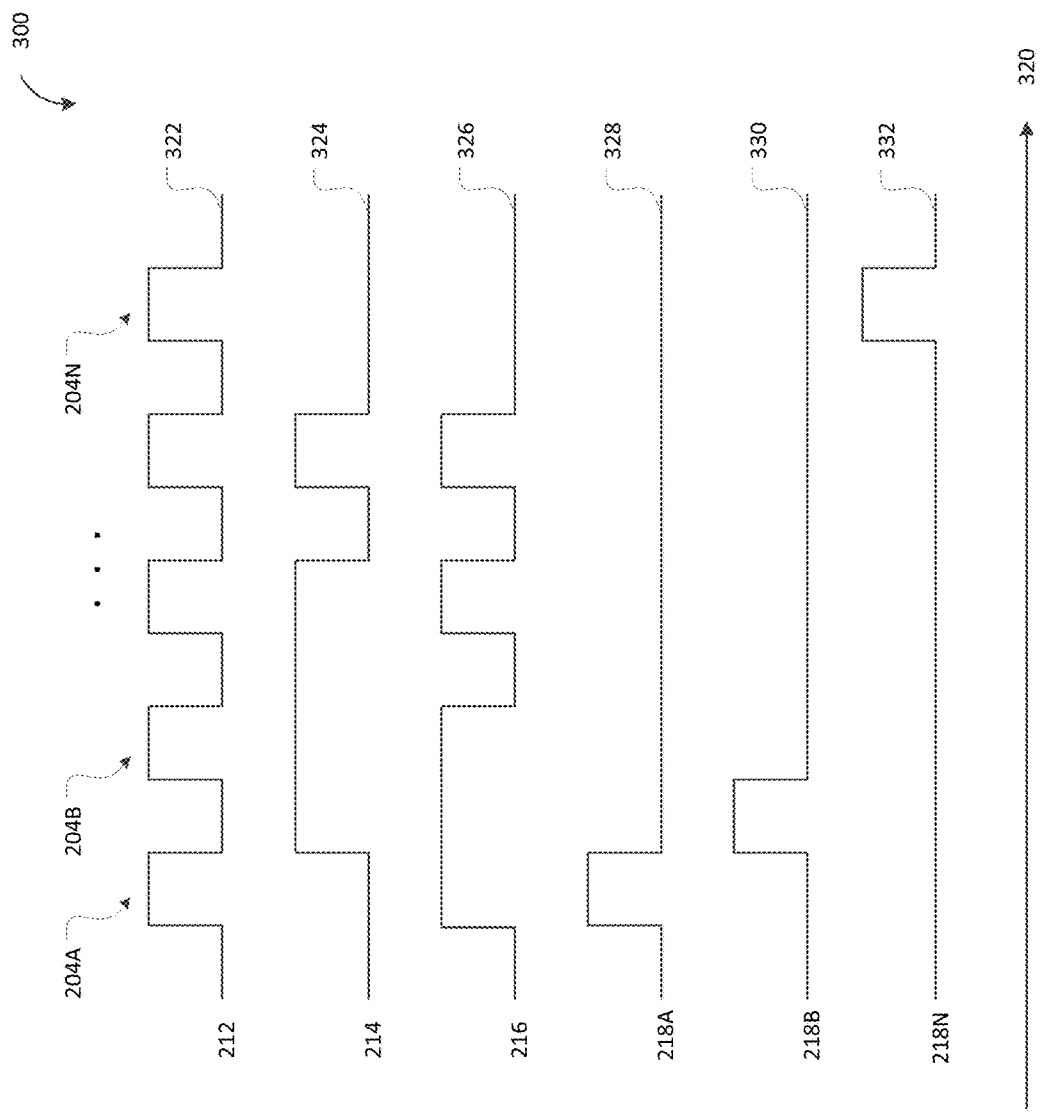
FIG. 3 shows a timing diagram of the example LED controller for implementing various embodiments of the present technology.

FIG. 3 shows a timing diagram illustrating a controller receiving sequences of bits over a period of time. Timing diagram 300 can be shown over a period of time 320. In this example, period of time 320 is eight cycles (i.e., eight sequences of bits received at the controller). Timing diagram 300 can represent each control line 212, 214, 216 as binary high (i.e., 1) or binary low (i.e., 0) through rows 322, 324, 326, respectively. Timing diagram 300 can represent selection lines 218 as binary high (i.e., 1) or binary low (i.e., 0) through rows 328, 330, 332 respectively. In an example at the first cycle of time, a sequence of bits is received at controller 200. The sequence of bits can correspond to a binary high (i.e., 1) for selection line 218A (e.g., corresponding to drive 204A), and timing diagram can show the corresponding row 328 as binary high. The remaining selection rows 330, 332 are shown as binary low. Also, during the first cycle of time, the sequence of bits is binary high (i.e., 1) for activity control line 212 and fail control line 216, and timing diagram can show corresponding rows 322 and 326 has binary high (i.e., 1). The sequence of bits is binary low (i.e., 0) for locate control line 214, and timing diagram can show corresponding row 324 as binary low. Thus, during the first cycle of time, activity LED 206A and fail LED 210A of drive 204A will display a pattern (e.g., illuminated, flashing, different color, etc).

Figure 4:
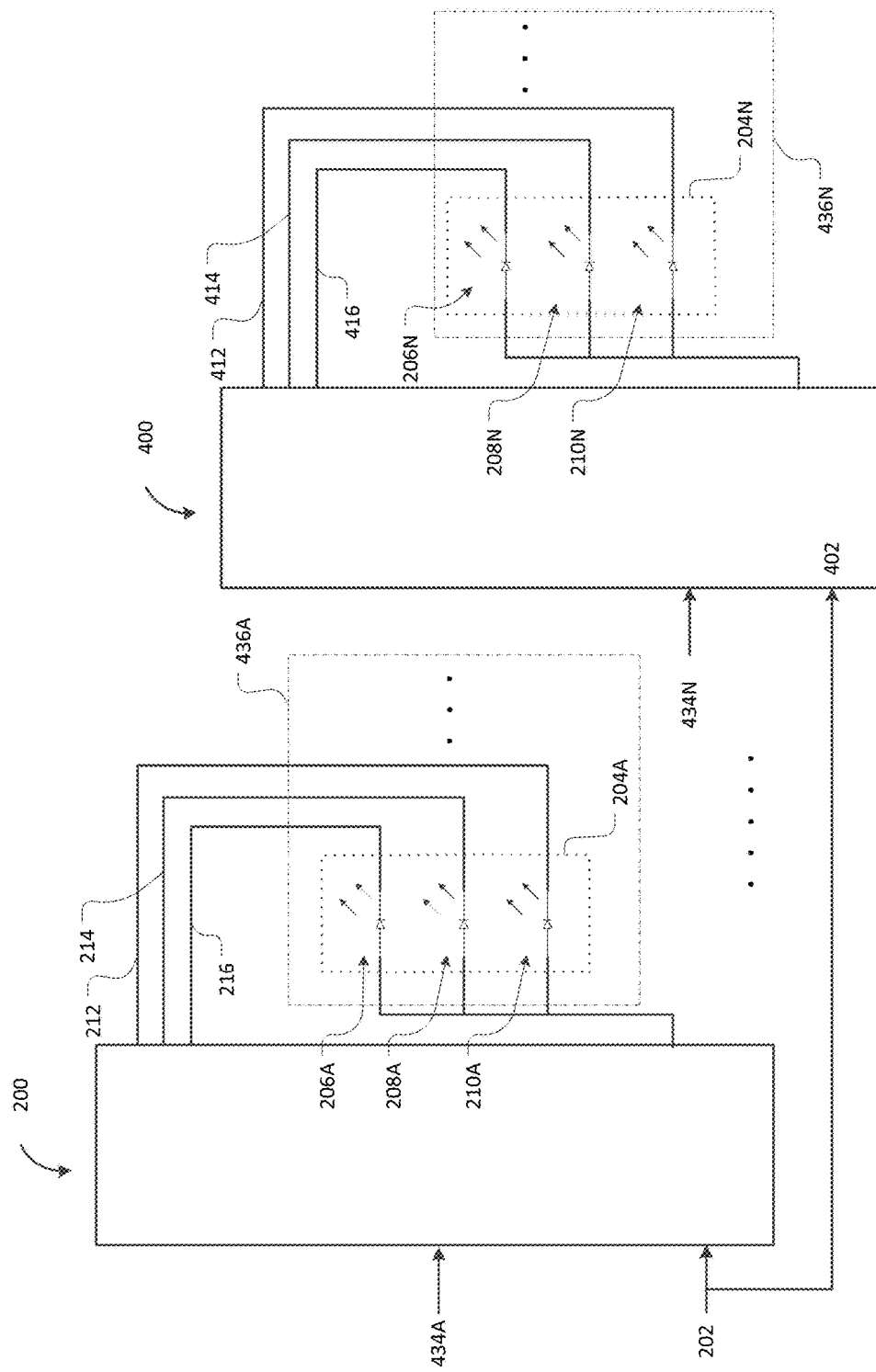
FIG. 4 shows example cascaded LED controllers for implementing various embodiments of the present technology.

FIG. 4 shows an example of cascaded configuration enabling control of an extended number of LEDs. A cascaded configuration includes two or more LED controllers. Controller 200 (previously shown in FIG. 2) can also include a device address input 434A. Device address input 434A can be configured to receive a device address (e.g., 0x0, 0x1, etc.). The device address can assign a controller a subset of drives. For example, controller 200 can receive at device address input 434A a device address 0x0. In response to receiving device address 0x0, controller 200 can be configured to control eight drives 204 in subset 436A.

The cascaded configuration can also include controller 400. Controller 400 includes similar features of controller 200 (shown in FIG. 2). Controller 400 can also be configured to receive a device address at device address input 434N for the assignment of a subset of drives. For example, controller 400 can receive at device address input 434N, a device address 0x1. In response to receiving device address 0x1, controller 200 can be configured to control eight drives 204 in subset 436N, different from subset 436A.

Figure 5:
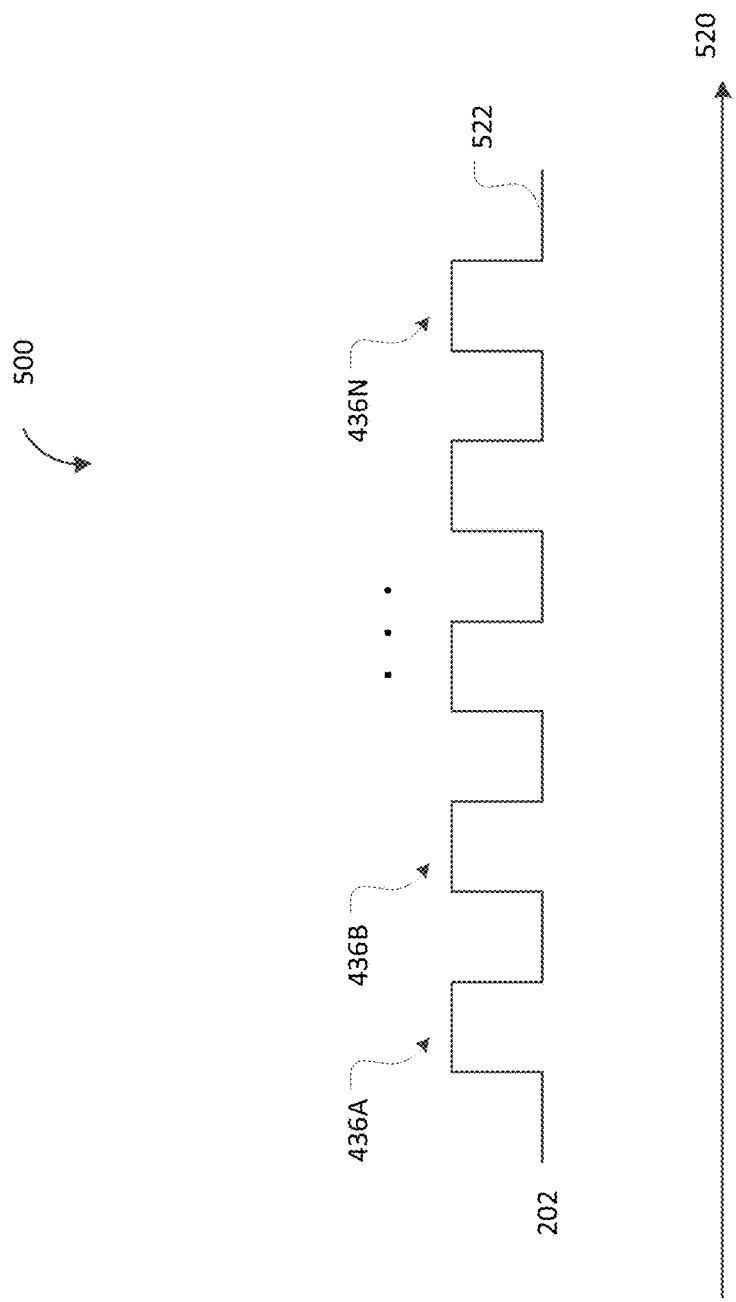
FIG. 5 shows a timing diagram of the example cascaded LED controllers for implementing various embodiments of the present technology.

FIG. 5 shows a timing diagram illustrating a selection of a subset of drives controlled by one of a plurality of controllers by the sequence of bits received via the SGPIO bus and a device address. Timing diagram 500 can be shown over a period of time 520. Timing diagram 500 can represent a selection of a subset of drives as binary high (i.e., 1) for each cycle (i.e., sequence of bits received through inputs 202, 402) by row 522. For example at a first cycle of time, controllers 200, 400 can receive a sequence of bits at input 202, 402 via the SGPIO bus. Based on the sequence of bits and the device address received, a subset of drives can be determined. For example, at the first cycle, the first subset 436A can be determined, when controllers 200 determines, based on the received device address, that controller 200 controls the subset of drives (e.g., 436A) to which the sequence of bits pertain. Thus row 522 is binary high (i.e., 1) for subset 436A.

Figure 6:
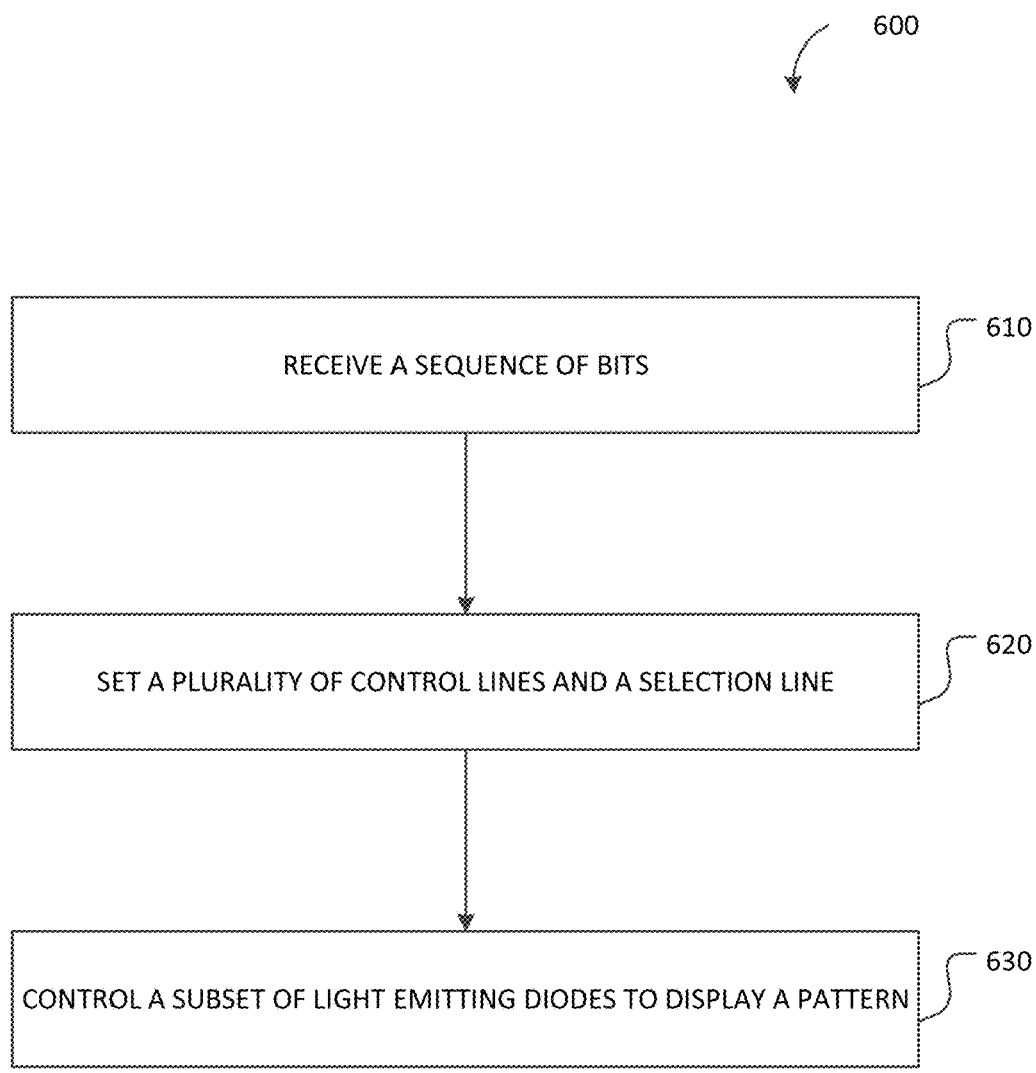
FIG. 6 shows a flow chart of an example method for time sharing the example LED controller for implementing various embodiments of the present technology.

The method shown in FIG. 6 is provided by way of example, as there are a variety of ways to carry out the method. Additionally, while the example method is illustrated with a particular order of steps, those of ordinary skill in the art will appreciate that FIG. 6 and the steps illustrated therein can be executed in any order that accomplishes the technical advantages of the present disclosure and can include fewer or more steps than illustrated.

Each step shown in FIG. 6 represents one or more processes, methods or subroutines, carried out in example method. The steps illustrated in FIG. 6 can be implemented in a system illustrated in FIG. 2. The flow chart illustrated in FIG. 6 will be described in relation to and make reference to at least controller 200, as illustrated in FIG. 1.

Method 600 can begin at step 610. At step 610, a controller 200 can receive at an input 202, a sequence of bits via a serial general purpose input/output bus. For example, the sequence of bits can include an activity bit, a locate bit, a fail bit, and one or more selection bits. When a sequence of bits has been received, method 600 can proceed to step 620.

At step 620, a plurality of control lines 212, 214, 216 and one selection line of a plurality of selection lines 218 can be set based on the sequence of bits. The control lines and selection lines can be connected to a plurality of LEDs 206, 208, 210 connected to a plurality of drives 204. For example, when the activity bit is binary high, and the locate bit and fail bit are binary low, control line 212 can have a binary high signal, and control lines 214, 216 can have binary low signals. Each selection line can be assigned binary sequence (e.g., 00, 01, 10, 001, 011, etc.). When the selection bits corresponded to one of the assigned binary sequences, the corresponding selection line can be set high. For example, when selection line 218A is assigned 00, and the selection bits are 00, selection line 218A is set binary high. When the control lines and a selection line are set, method 600 can proceed to step 630.

At step 630, a subset of LEDs 206, 208, 210 can display a pattern based on the setting of the control lines. For example, when activity control line 212 and selection line 218A are set to binary high, LED 206A of drive 204A displays a pattern (e.g., illuminated, flashing, different color, etc.). When a subset of LEDs display a pattern, method 600 can end.

Figure 7:
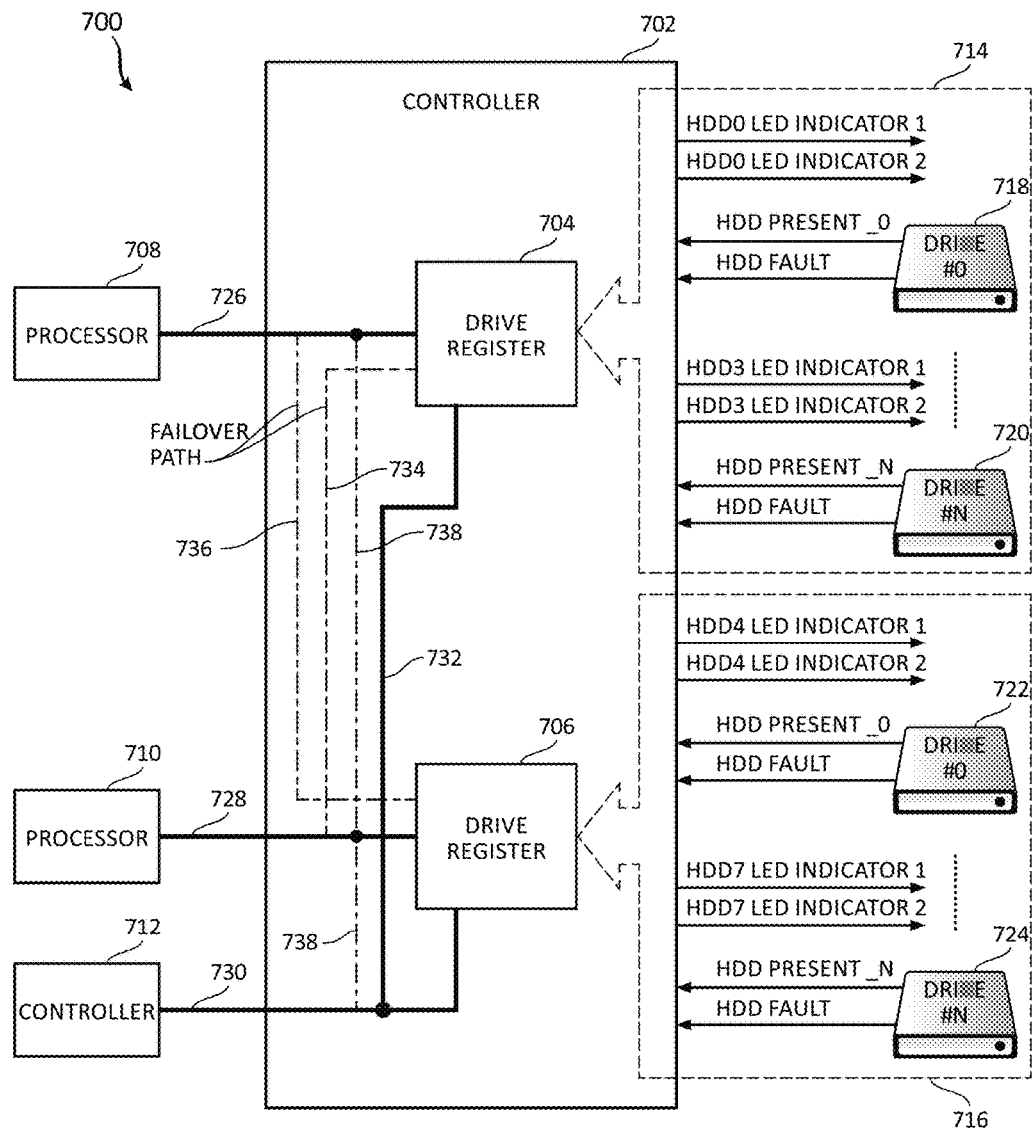
FIG. 7 shows an example system for drive management for implementing various embodiments of the present technology.

FIG. 7 shows an example system 700 for drive management. A controller 702 can be implemented for managing drives (e.g., NVMe drives). The controller 702 can include drive registers 704, 706. Drive registers 704, 706 can be configured to communicate with drives 718-724 to obtain control and/or monitor drives 718-724. For example, drive register 704 can be communicatively coupled with group 714 of drives, and drive register 706 can be communicatively coupled with group 716 of drives. Drive register 704 can obtain status information or conditions from group 714 of drives, and drive register 706 can obtain status information or conditions from group 716 of drives.

For example, drive register 704 can receive presence signals from group 714 of drives. Drive register 704 can also send control signals to group 714 of drives. Similarly, drive register 706 can receive presence signals from group 716 of drives, and send control signals to group 716 of drives.

Each drive register can connect to multiple drives in order to monitor and control the multiple drives, without implementing multiple input/output expander chips to support the multiple drives. Moreover, drive register 704, 706 can connect to processors 708, 710 to relay or send status information from groups 714, 716 of drives. For example, drive register 704 can connect to processor 708 via communication bus 726, and drive register 706 can connect to processor 710 via communication bus 728.

Processor 708 can be configured to monitor and manage group 714 of drives, and processor 710 can be configured to monitor and manage group 716 of drives. For example, processor 708 can communicate with drive register 704 to obtain status information about group 714 of drives, as well as send control signals to group 714 of drives. Processor 710 can communicate with drive register 706 to obtain status information about group 716 of drives, as well as send control signals to group 716 of drives. Accordingly, processor 708 can receive presence signals from, and send control signals to, group 714 of drives via drive register 704, and processor 710 can receive presence signals from, and send control signals to, group 716 of drives via drive register 706.

In order to provide failover, drive register 704 can also connect to processor 710 via communication bus 734, and drive register 706 can connect to processor 708 via communication bus 736. Thus, if processor 708 or the communication bus 726 between processor 708 and drive register 704 fails, processor 710 can communicate with drive register 704 via communication bus 734 to continue monitoring and/or management operations for group 714 of drives. Similarly, if processor 710 or communication bus 728 between processor 710 and drive register 706 fails, processor 708 can communicate with drive register 706 via communication bus 736 to continue monitoring and/or management operations for group 716 of drives.

Moreover, controller 712 can be coupled with drive registers 704, 706 to monitor and/or manage drives 718-724 in groups 714, 716 of drives. For example, controller 712 can connect with drive register 704 via communication bus 732, and drive register 706 via communication bus 730. Controller 712 can obtain presence and status information about drives 718-724 from drive registers 704, 706, and maintain or log the status information for management and administration. Controller 712 can also send management signals to drive registers 704, 706 and/or processors 708, 710 to manage drives 718-724. For example, controller 712 can send control signals to drive registers 704, 706 and/or processors 708, 710 to manage drives 718-724 as well as hot-plug operations.

Controller 712 can also monitor communications from processors 708, 710 to drive registers 704, 706 to detect any communication failures. For example, controller 712 can monitor communication buses 726, 728 to detect any errors or problems with communication buses 726, 728. In some examples, controller 712 can connect to processors 708, 710 via bus 738 to monitor communications from processors 708, 710 to drive registers 704, 706 in order to detect any communication failures.

In response to a failure or error detected for communication buses 726, 728, controller 712 can provide failover of management and monitoring operations for groups 714, 716 of drives. For example, processor 708 can communicate with drive register 704 via communication bus 726 to monitor and/or manage group 714 of drives. If controller 712 detects a problem with communication bus 726 and/or processor 708, controller 712 can instruct processor 710 and/or drive register 704 to share monitoring and management information about group 714 of drives via failover communication bus 734. Thus, controller 712 can switch monitoring and management of group 714 of drives from processor 708 to processor 710.

Alternatively, if controller 712 detects a problem with communication bus 728 and/or processor 710, it can instruct processor 708 and/or drive register 706 to share monitoring and management information about group 716 of drives via failover communication bus 736. Thus, controller 712 can switch monitoring and management of group 716 of drives from processor 710 to processor 708.

Controller 712 can be a microcontroller or processor (e.g., BMC, etc.). Moreover, communication buses 726, 728, 730, 734, 736 can be any type of communication bus, such as a serial bus (e.g., inter-integrated circuit bus, etc.). Further, as one of ordinary skill in the art will readily recognize, processors 708, 710 can be part of a same or separate computing device. For example, processors 708, 710 can reside in a single server or different servers.

The number of controllers, processors, drive registers, and/or drives (and groups thereof) in FIG. 7 are non-limiting examples provided for explanation purposes. One of ordinary skill in the art will recognize that other examples can include more or less controllers, processors, drive registers, drives, and/or groups of drives.

Figure 8:
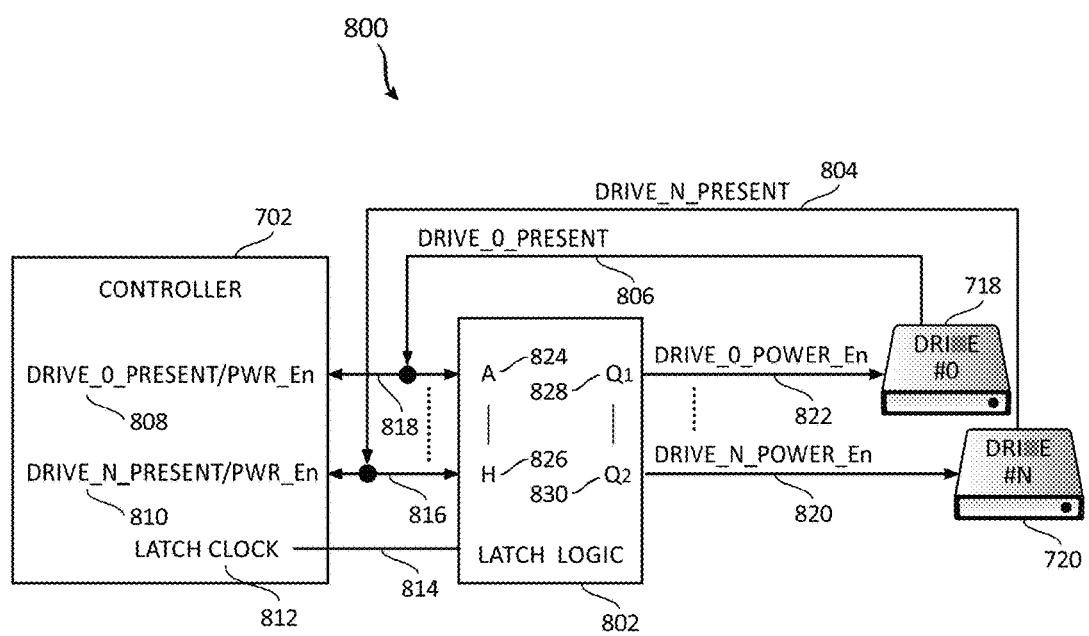
FIG. 8 shows an example topology for drive power control management for implementing various embodiments of the present technology.

FIG. 8 shows an example topology 800 for power control management. Controller 702 can communicate with latch logic circuitry 802 to provide power control management for drives 718-720. Latch logic circuitry 802 can store state or power information, such as presence or power status, of drives 718-720. The latch logic circuitry 802 can also include interfaces 824-830 (e.g., pins) for receiving power enable signals 816-818 from controller 702, and sending power enable signals 820-822 to drives 718-720.

Controller 702 can include multifunction interfaces 808-810 for receiving presence signals from, and sending power enable signals to, drives 718-720. For example, controller 702 can receive presence signal 806 from NVMe 718 at multifunction interface 808, and presence signal 804 from drive 720 at multifunction interface 810. Each of the multifunction interfaces 808-810 can be, for example, a multifunction pin, such as a presence and power enable pin.

Controller 702 can determine a presence status of drives 718 and 720 based on presence signals 804-806 received at multifunction interfaces 808-810. Controller 702 can then send power enable signals 816-818 to latch logic circuitry 802 via multifunction interfaces 808-810. Latch logic circuitry 802 can receive power enable signals 816-818 via interfaces 824-826, and send power enable signals 820-822 to drives 718-720 via interfaces 828-830. Power enable signals 820-822 can power drives 718-720.

Controller 702 can also include latch clock 812. Latch clock 812 can send clocked or synchronous signals 814 to latch logic circuitry 802. Latch logic circuitry 802 can use clocked or synchronous signals 814 for clocking, synchronizing, or timing power enable signals 820-822 to drives 718-720.

Figure 9:
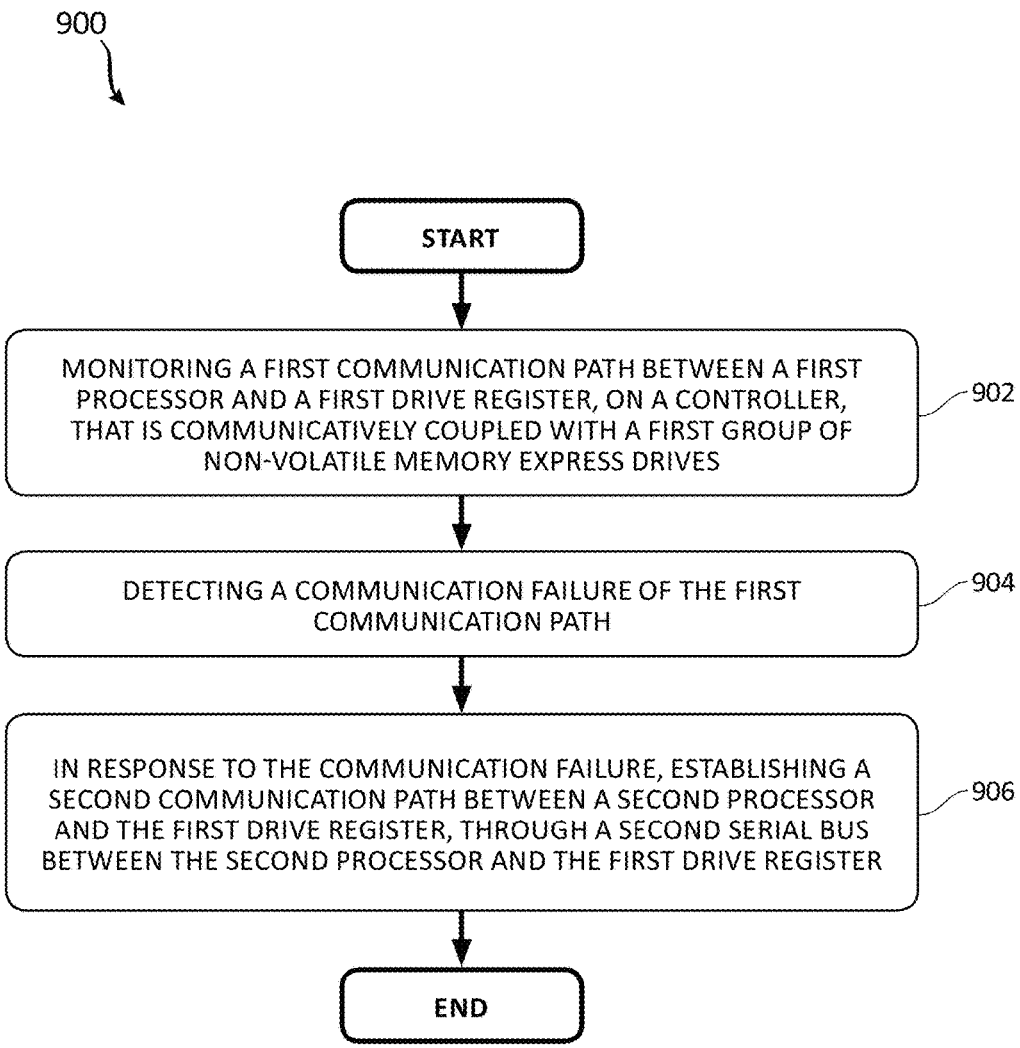
FIG. 9 shows a flow chart of an example method for management of non-volatile memory express drives.

The method shown in FIG. 9 is provided by way of example, as there are a variety of ways to carry out the method. Additionally, while the example method is illustrated with a particular order of steps, those of ordinary skill in the art will appreciate that FIG. 9 and the steps illustrated therein can be executed in any order that accomplishes the technical advantages of the present disclosure and can include fewer or more steps than illustrated.

Each step shown in FIG. 9 represents one or more processes, methods or subroutines, carried out in example method. The steps illustrated in FIG. 9 can be implemented in a system illustrated in FIG. 7. The flow chart illustrated in FIG. 9 will be described in relation to and make reference to at least system 700, as illustrated in FIG. 7.

Method 900 can begin at step 902, controller 712 can monitor bus 726 between processor 708 and drive register 704. Drive register 704 can be communicatively coupled with group 714 of drives, which can include drives 718-720, to send and receive status and/or control signals to and from group 714 of drives. Drive register 704 can send signals from group 714 of drives to processor 708, and receive signals from processor 708 and communicate those signals to specific drives in group 714 of drives. Processor 708 can manage (e.g., monitor, control, power, etc.) group 714 of drives by exchanging such signals with drive register 704 via bus 726. For example, processor 708 can receive status information about group 714 of drives from drive register 704 via bus 726. Processor 708 can monitor and/or maintain status information about group 714 of drives, and send control signals or commands to specific drives in group 714 of drives. When the controller has monitored the bus, method 900 can proceed to step 904.

At step 904, controller 712 can detect a communication failure between processor 708 and register 704. The communication failure can be a failure of bus 726 and/or processor 708, which prevents communications with processor 708 through bus 726. For example, the communication failure can be caused by a problem with bus 726 (e.g., a disconnection, malfunction, etc.). As another example, the communications failure can be a problem with processor 708. When the controller has detected a communication failure, method 900 can proceed to step 906.

At step 906, and in response to the communications failure, controller 712 can assign process 710 to manage (e.g., monitor, control, power, etc.) group 714 of drives via bus 734 and drive register 704. For example, controller 712 can switch control of monitoring operations for group 714 of drives from processor 708 to processor 710. Thus, controller 712 can enable monitoring of group 714 of drives to be taken over by processor 710 from processor 708. Drive register 704 can then communicate with processor 710 monitoring and/or control signals associated with drives 718-720 in group 714 of drives.

Drive register 704 and processor 710 can communicate over bus 734, which can provide a failover path for drive register 704 to communicate presence, control, and/or power signals with processor 710 when it is unable to communicate with processor 708. Processor 710 can then obtain presence or status information for group 714 of drives from drive register 704, and send signals (e.g., control, power, etc.) to group 714 of drives through bus 734 and drive register 704.

Controller 712 can also, or alternatively, detect any communications failure associated with processor 710. For example, drive register 706 can be coupled with drives 722-724 in the group 716 of drives, in order to communicate status and/or control information (e.g., presence and/or control signals) with drives 722-724. Moreover, processor 710 can communicate with drive register 706 to monitor and maintain status information about drives 722-724 in group 716. Processor 710 and drive register 706 can communicate such information via bus 728. Controller 712 can monitor processor 710 and/or bus 728 to determine if drive register 706 is able to communicate with processor 710. If drive register 706 is unable to communicate with processor 710, controller 712 can detect such communications failure and, in response, switch control of management (e.g., monitoring, controlling, etc.) operations for group 716 of drives from processor 710 to processor 708.

Controller 712 can thus enable management of group 716 of drives to be taken over by processor 708 from processor 710. Drive register 706 can then communicate with processor 708 for monitoring of drives 722-724 in group 716 of drives. Drive register 706 and processor 708 can communicate over bus 736, which can provide a failover path for drive register 706 to communicate presence, control, and/or power signals with processor 708 when it is unable to communicate with processor 710. Processor 708 can then obtain presence or status information for group 716 of drives from drive register 706, and send control signals to the group 716 of drives through bus 736 and drive register 706.

Accordingly, in a drive management system, such as system 700, controller 712 can detect communications failures between processors and drive registers. When controller 712 detects a communications failure between a processor and a drive register that are associated with a group of drives (e.g., that are monitoring and/or managing the drives), controller 712 can enable the drive register to communicate with a different processor through a failover path. The drive register can then exchange, with the different processor through the failover path, status and/or control information for the group of drives. The different processor can thus communicate with the drive register, via the failover path, to monitor and/or control the group of drives. When the controller has assigned a process to manage the group of drives, method 900 can end.

Figure 10:
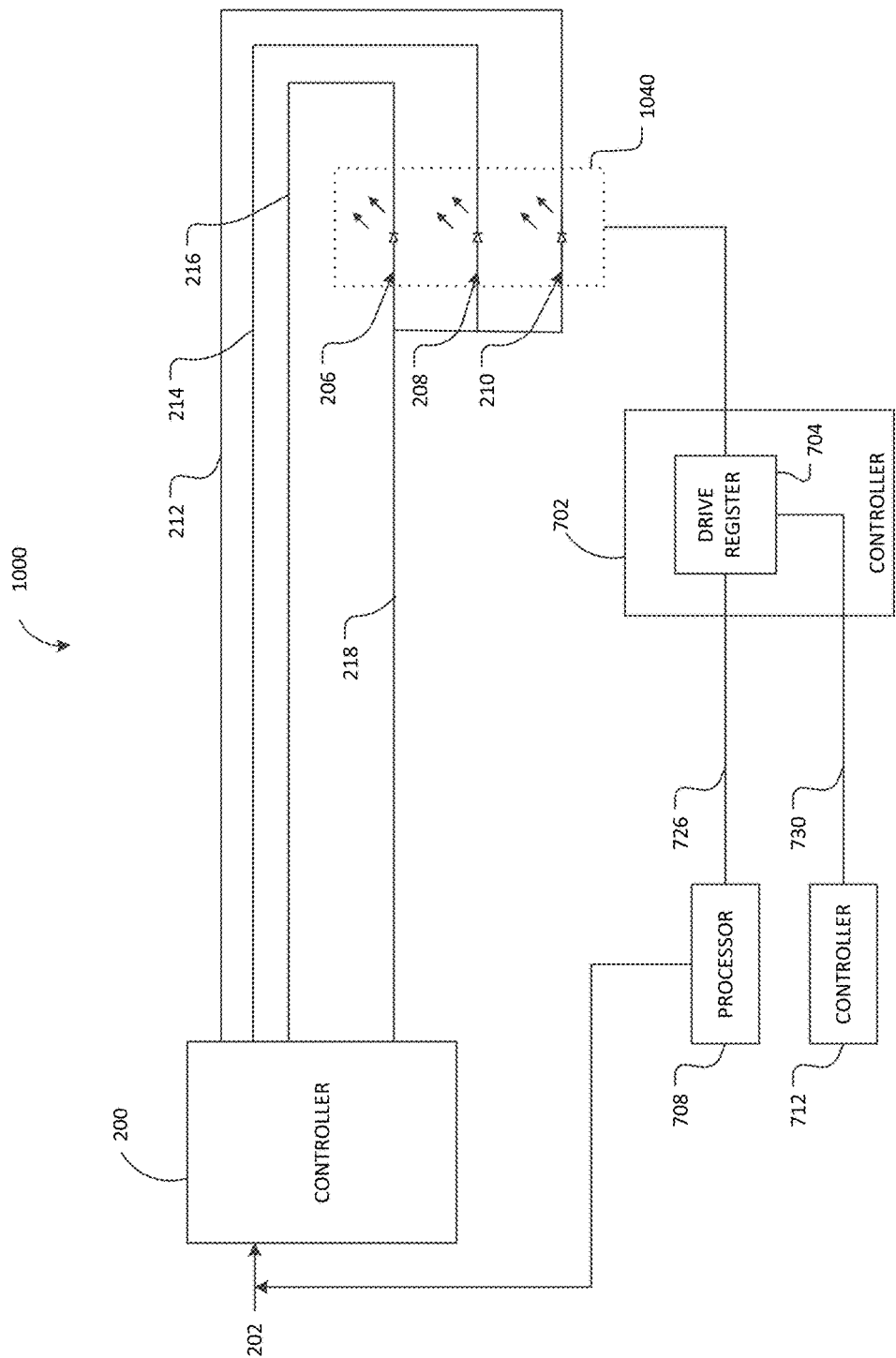
FIG. 10 shows an example combination LED controller and system for drive management for implementing various embodiments of the present technology

FIG. 10 shows an example combination LED controller and drive management system 1000. The elements of FIG. 10 are shown in reduced capacity form in order to demonstrate combination system 1000. The elements of FIG. 10 are further demonstrated in previous embodiments (e.g., LED controller 200 in FIG. 2, controller 702 and drive register 704, 706 in FIG. 7). The absence or reduced capacity of an element should not suggest the element cannot and would not be included in combination system 1000 (e.g., drive register 706).

Combination system 1000 can include LED controller 200 configured to control a high number of LEDs (206, 208, 210). Detailed operation of LED controller 200 is shown in FIG. 2. Combination system 1000 can also include drive 1040 (e.g., drives 204, drives 718-724, groups 714-716 of drives, etc.). While drive 1040 is shown as a single drive with three LEDs (206, 208, 210), drive 1040 is merely representative of a plurality of disk drives (drives 204, drives 718-724, etc.) as shown in FIG. 2 and FIG. 7.

Combination system 1000 can include controller 702 for managing drive 1040. Controller 702 can include one or more drive registers (704, 706). Drive registers 704, 706 can be configured to communicate with drive 1040 to obtain control and/or monitor the drive 1040. Detailed operation of controller 702 and drive registers 704, 706 is shown in FIG. 7.

Combination system 1000 can include one or more processors (708, 710). Processors (708, 710) can obtain, from drive registers (704, 706) of controller 702 status information about drive 1040. The status information can include activity, locate, and fail status of drive 1040. In response to receiving status information, processors (708, 710) can determine if (or when) the status information of drive 1040 corresponds to an activity, locate and/or fail status. When processor (708, 710) determines the status information corresponds to an activity, locate and/or fail status of drive 1040, processor (708, 710) can send a sequence of bits to input 202 of LED controller 200. LED controller 200 can then, as outlined in FIG. 2, illuminate LEDs (206, 208, 210) of drive 1040 corresponding to the status information of drive 1040.

Combination system 1000 can be best described by the following non-limiting example. In this example, drive 1040 can fail. Drive register 704 can be monitoring drive 1040. Drive register 704 can obtain the status information of drive 1040, which indicates drive 1040 has failed. In response to obtaining the status information indicating a failure of drive 1040, controller 702 can send the status information to processor 708. Processor 708 can determine, based on the status information, that drive 1040 has failed. Processor 708 can then generate a sequence of bits. The sequence of bits can indicate drive 1040 and can also indicate a binary high for the fail bit. In some embodiments, since drive 1040 has failed and will need to be replaced, processor 708 can also indicate binary high for the locate bit. Processor 708 can then send the sequence of bits to input 202 of LED controller 200. In response to receiving the sequence of bits, LED controller 200 can toggle the appropriate lines (e.g., control line 218 for drive 1040, locate line 214 and fail line 216). The corresponding LEDs (locate 208, fail 210) of drive 1040 can then be illuminated.

Figure 11A:
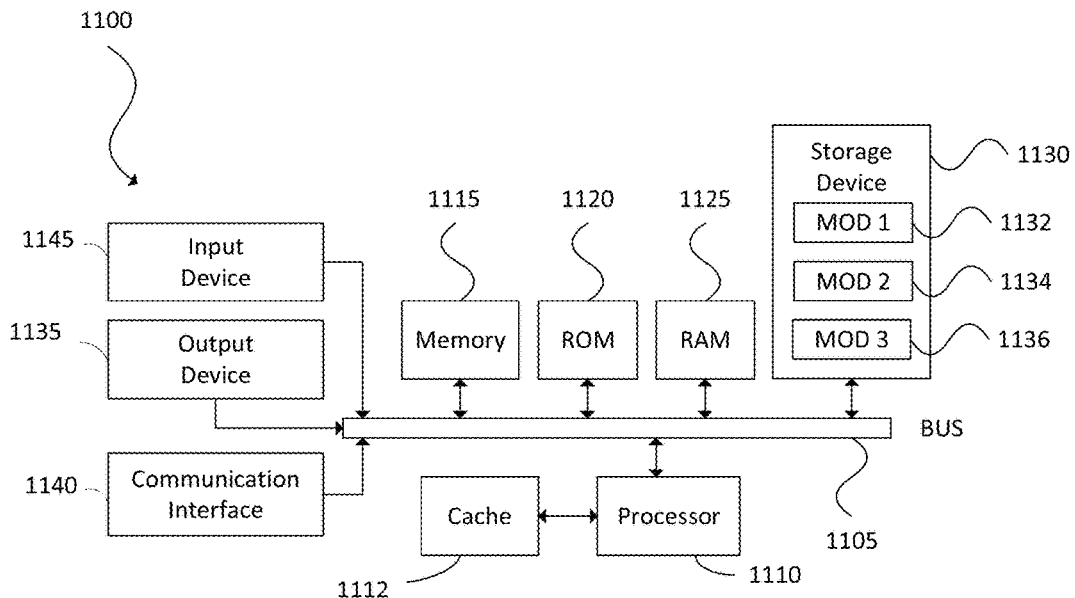
FIG. 11A shows an exemplary possible system embodiment for implementing various embodiments of the present technology.
Figure 11B:
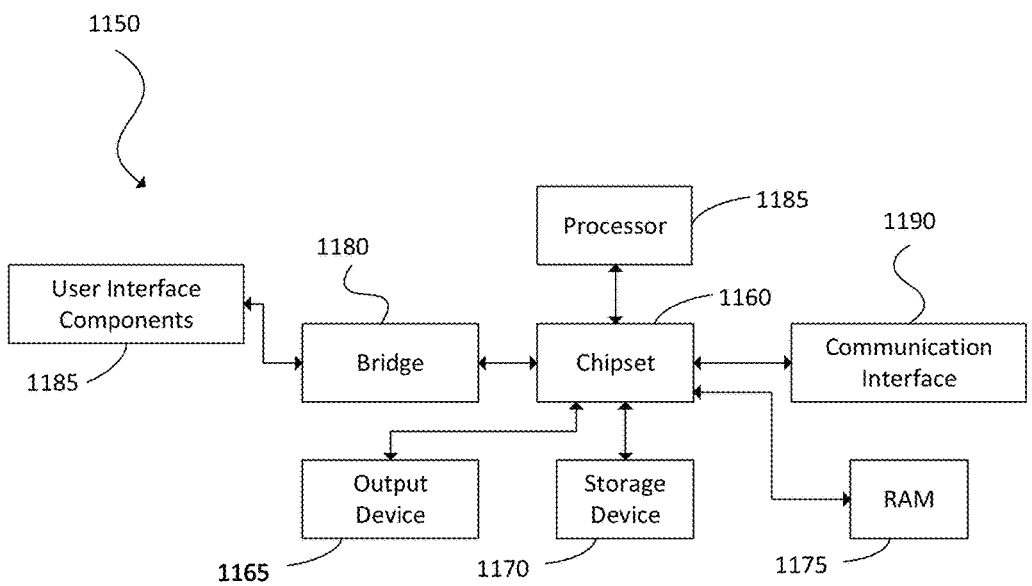
FIG. 11B shows an exemplary possible system embodiment for implementing various embodiments of the present technology.

FIG. 11A and FIG. 11B show exemplary possible system embodiments. The more appropriate embodiment will be apparent to those of ordinary skill in the art when practicing the present technology. Persons of ordinary skill in the art will also readily appreciate that other system embodiments are possible.

FIG. 11A illustrates a conventional system bus computing system architecture 1100 wherein the components of the system are in electrical communication with each other using a bus 110. Exemplary system 1100 includes a processing unit (CPU or processor) 1110 and a system bus 1105 that couples various system components including the system memory 1115, such as read only memory (ROM) 1120 and random access memory (RAM) 1125, to the processor 1110. The system 1100 can include a cache of high-speed memory connected directly with, in close proximity to, or integrated as part of the processor 1110. The system 1100 can copy data from the memory 1115 and/or the storage device 1130 to the cache 1112 for quick access by the processor 1110. In this way, the cache can provide a performance boost that avoids processor 1110 delays while waiting for data. These and other modules can control or be configured to control the processor 1110 to perform various actions. Other system memory 1115 may be available for use as well. The memory 1115 can include multiple different types of memory with different performance characteristics. The processor 1110 can include any general purpose processor and a hardware module or software module, such as module 1 1132, module 2 1134, and module 3 1136 stored in storage device 1130, configured to control the processor 1110 as well as a special-purpose processor where software instructions are incorporated into the actual processor design. The processor 1110 may essentially be a completely self-contained computing system, containing multiple cores or processors, a bus, memory controller, cache, etc. A multi-core processor may be symmetric or asymmetric.

To enable user interaction with the computing device 1100, an input device 1145 can represent any number of input mechanisms, such as a microphone for speech, a touch-sensitive screen for gesture or graphical input, keyboard, mouse, motion input, speech and so forth. An output device 1135 can also be one or more of a number of output mechanisms known to those of skill in the art. In some instances, multimodal systems can enable a user to provide multiple types of input to communicate with the computing device 1100. The communications interface 1140 can generally govern and manage the user input and system output. There is no restriction on operating on any particular hardware arrangement and therefore the basic features here may easily be substituted for improved hardware or firmware arrangements as they are developed.

Storage device 1130 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1125, read only memory (ROM) 1120, and hybrids thereof.

The storage device 1130 can include software modules 1132, 1134, 1136 for controlling the processor 1110. Other hardware or software modules are contemplated. The storage device 1130 can be connected to the system bus 1105. In one aspect, a hardware module that performs a particular function can include the software component stored in a computer-readable medium in connection with the necessary hardware components, such as the processor 1110, bus 1105, display 1135, and so forth, to carry out the function.

FIG. 11B illustrates a computer system 1150 having a chipset architecture that can be used in executing the described method and generating and displaying a graphical user interface (GUI). Computer system 1150 is an example of computer hardware, software, and firmware that can be used to implement the disclosed technology. System 1150 can include a processor 1155, representative of any number of physically and/or logically distinct resources capable of executing software, firmware, and hardware configured to perform identified computations. Processor 1155 can communicate with a chipset 1160 that can control input to and output from processor 1155. In this example, chipset 1160 outputs information to output 1165, such as a display, and can read and write information to storage device 1170, which can include magnetic media, and solid state media, for example. Chipset 1160 can also read data from and write data to RAM 1175. A bridge 1180 for interfacing with a variety of user interface components 1185 can be provided for interfacing with chipset 1160. Such user interface components 1185 can include a keyboard, a microphone, touch detection and processing circuitry, a pointing device, such as a mouse, and so on. In general, inputs to system 1150 can come from any of a variety of sources, machine generated and/or human generated.

Chipset 1160 can also interface with one or more communication interfaces 1190 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 1155 analyzing data stored in storage 1170 or 1175. Further, the machine can receive inputs from a user via user interface components 1185 and execute appropriate functions, such as browsing functions by interpreting these inputs using processor 1155.

It can be appreciated that exemplary systems 1100 and 1150 can have more than one processor 1110 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software. In some instances, the present technology has been described with respect to peripheral component interconnect express devices. However, the methods and concepts according to the above-described examples can be implemented for hardware recovery of other types of devices. Indeed, the concepts described herein can be implemented for hardware recovery, including hot-add and hot-remove, of any device with hot-plug or hot-swap support, such as universal serial bus (USB) devices. Again, peripheral component interconnect express devices are used herein as non-limiting examples for the sake of clarity and explanation purposes.

Any of the steps, operations, functions, or processes described herein may be performed or implemented by a combination of hardware and software modules, alone or in combination with other devices. In an embodiment, a software module can be software that resides in memory of a client device and/or one or more servers of a content management system and perform one or more functions when a processor executes the software associated with the module. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A system comprising:
   a first controller comprising a first drive register and a second drive register;
   a first processor communicatively coupled with the first drive register via a first serial bus;
   a second processor communicatively coupled with the second drive register via a second serial bus;
   a first set of non-volatile memory express drives communicatively coupled with the first processor via the first drive register and the first serial bus;
   a second set of non-volatile memory express drives communicatively coupled with the second processor via the second drive register and the second serial bus; and
   a second controller communicatively coupled with the first drive register via a third serial bus, and the second drive register respectively via a fourth serial bus;
   wherein the first processor is further communicatively coupled with the second drive register via a fifth serial bus, and the second processor is further communicatively coupled with the first drive register via a sixth serial bus.

2. The system of claim 1, wherein the second controller is configured to determine and maintain status conditions of the first set of non-volatile memory express drives and the second set of non-volatile memory express drives.

3. The system of claim 2, wherein the second controller is configured to determine the status conditions based on one or more drive signals received by the first drive register or the second drive register.

4. The system of claim 1, wherein the first processor is configured to monitor the first set of non-volatile memory express drives based on one or more signals received from the first set of non-volatile memory express drives through the first drive register, and wherein the second processor is configured to monitor the second set of non-volatile memory express drives based on one or more signals received from the second set of non-volatile memory express drives through the second drive register.

5. The system of claim 4, wherein the second controller is configured to detect a communication failure between the first processor and the first drive register and, in response to the communication failure, establish a communication path between the first set of non-volatile memory express drives and the second processor through the sixth serial bus, for monitoring the first set of non-volatile memory express drives via the second processor.

6. The system of claim 4, wherein the second controller is configured to detect when a new non-volatile memory express drive is connected to, and disconnected from, the first drive register or the second drive register.

7. The system of claim 4, wherein the second controller comprises a baseboard management controller, and wherein the first serial bus, the second serial bus, the third serial bus, the fourth serial bus, the fifth serial bus, and the sixth serial bus comprise inter-integrated circuit buses.

8. The system of claim 1, further comprising:
latch logic circuitry communicatively coupled with the second controller and one or more non-volatile memory express drives associated with the first set of non-volatile memory express drives or the second set of non-volatile memory express drives.

9. The system of claim 8, wherein each respective one of the one or more non-volatile memory express drives is coupled with the latch logic circuitry via a respective output pin configured to output a respective power enable bit to the respective one of the one or more non-volatile memory express drives in response to a presence bit transmitted by the respective one of the one or more non-volatile memory express drives to at least one of the second controller and the latch logic circuitry.

10. The system of claim 9, wherein the latch logic circuitry comprises a respective input pin configured to receive the respective power enable bit from the second controller, wherein the second controller comprises a respective presence pin communicatively coupled with the respective input pin associated with the latch logic circuitry.

11. The system of claim 10, wherein the respective presence pin is configured to function as a multifunction pin capable of receiving presence bits from the respective one of the non-volatile memory express drives and sending the respective power enable bit to the respective input pin for powering the respective one of the non-volatile memory express drives.

12. A system comprising:
a first set of non-volatile memory express drives connected to a first drive register in a first controller, wherein the first drive register is configured to obtain first presence indications from the first set of non-volatile memory express drives;
a second set of non-volatile memory express drives connected to a second drive register in the first controller, wherein the second drive register is configured to obtain second presence indications from the second set of non-volatile memory express drives;
a first processor connected to the first drive register via a first serial bus, wherein the first processor is configured to monitor the first set of non-volatile memory express drives based on presence information received from the first drive register in response to the first presence indications;
a second processor connected to the second drive register via a second serial bus, wherein the second processor is configured to monitor the second set of non-volatile memory express drives based on presence information received from the second drive register in response to the second presence indications; and
a second controller connected to the first drive register via a third serial bus and the second drive register via a fourth serial bus, wherein the second controller is configured to determine status conditions of the first set of non-volatile memory express drives and the second set of non-volatile memory express drives based on respective status information received from the first drive register and the second drive register,
wherein the first processor is also connected with the second drive register via a fifth serial bus, and wherein the second processor is also connected with the first drive register via a sixth serial bus.

13. The system of claim 12, wherein the second controller is further configured to: detect when a new non-volatile memory express drive is added to the first set of non-volatile memory express drives or the second set of non-volatile memory express drives.

14. The system of claim 12, wherein the second controller is further configured to:
detect a communication failure between the first processor and the first drive register; and
in response to the communication failure, instruct the second processor to monitor the first set of non-volatile memory express drives via the first drive register.

15. The system of claim 12, further comprising:
latch logic circuitry connected with the second controller and one or more non-volatile memory express drives associated with the first set of non-volatile memory express drives or the second set of non-volatile memory express drives, the latch logic circuitry comprising:
a respective output pin configured to output a respective power enable bit to a respective one of the one or more non-volatile memory express drives; and
a respective input pin configured to receive the respective power enable signal from a respective presence pin associated with the first controller, wherein the respective presence pin is configured to function as a multifunction pin capable of receiving presence signals from the respective one of the one or more non-volatile memory express drives and output the respective power enable signal to the respective input pin associated with the latch logic circuitry.

16. A method comprising:
monitoring, via a first controller, a first communication path between a first processor and a first drive register on a second controller, wherein the first drive register is communicatively coupled with a plurality of non-volatile memory express drives, and wherein the first processor is configured to obtain status information about the plurality of non-volatile memory express drives from the first drive register via the first communication path;

detecting, by the first controller, a communication failure of the first communication path; and in response to the communication failure, assigning, by the first controller, a second processor to receive the status information about the plurality of non-volatile memory express drives from the first drive register via a second communication path between the second processor and the first drive register, wherein the second controller comprises a second drive register coupled with a second plurality of non-volatile memory express drives, wherein the first controller is communicatively coupled with the first drive register, and the second drive register, respectively;

wherein the first processor is further communicatively coupled with the first drive register; and wherein the second processor is further communicatively coupled with the first drive register.

17. The method of claim 16, wherein the second drive register is configured to communicate, with at least one of the first controller and the second processor, status signals associated with the second plurality of non-volatile memory express drives.

18. The method of claim 16, wherein the second controller is coupled to latch logic circuitry communicatively, the latch logic circuitry being communicatively coupled to one or more non-volatile memory express drives associated with the first set of non-volatile memory express drives or the second set of non-volatile memory express drives.

19. The method of claim 18, wherein each respective one of the one or more non-volatile memory express drives is coupled with the latch logic circuitry via a respective output pin configured to output a respective power enable bit to the respective one of the one or more non-volatile memory express drives in response to a presence bit transmitted by the respective one of the one or more non-volatile memory express drives to at least one of the second controller and the latch logic circuitry.

20. The method of claim 19, wherein the latch logic circuitry comprises a respective input pin configured to receive the respective power enable bit from the second controller, wherein the second controller comprises a respective presence pin communicatively coupled with the respective input pin associated with the latch logic circuitry.

* * * * *